Feb. 14, 1950     A. CLARK     2,497,761
SYNTHESIS OF HYDROCARBONS
Filed Sept. 10, 1945
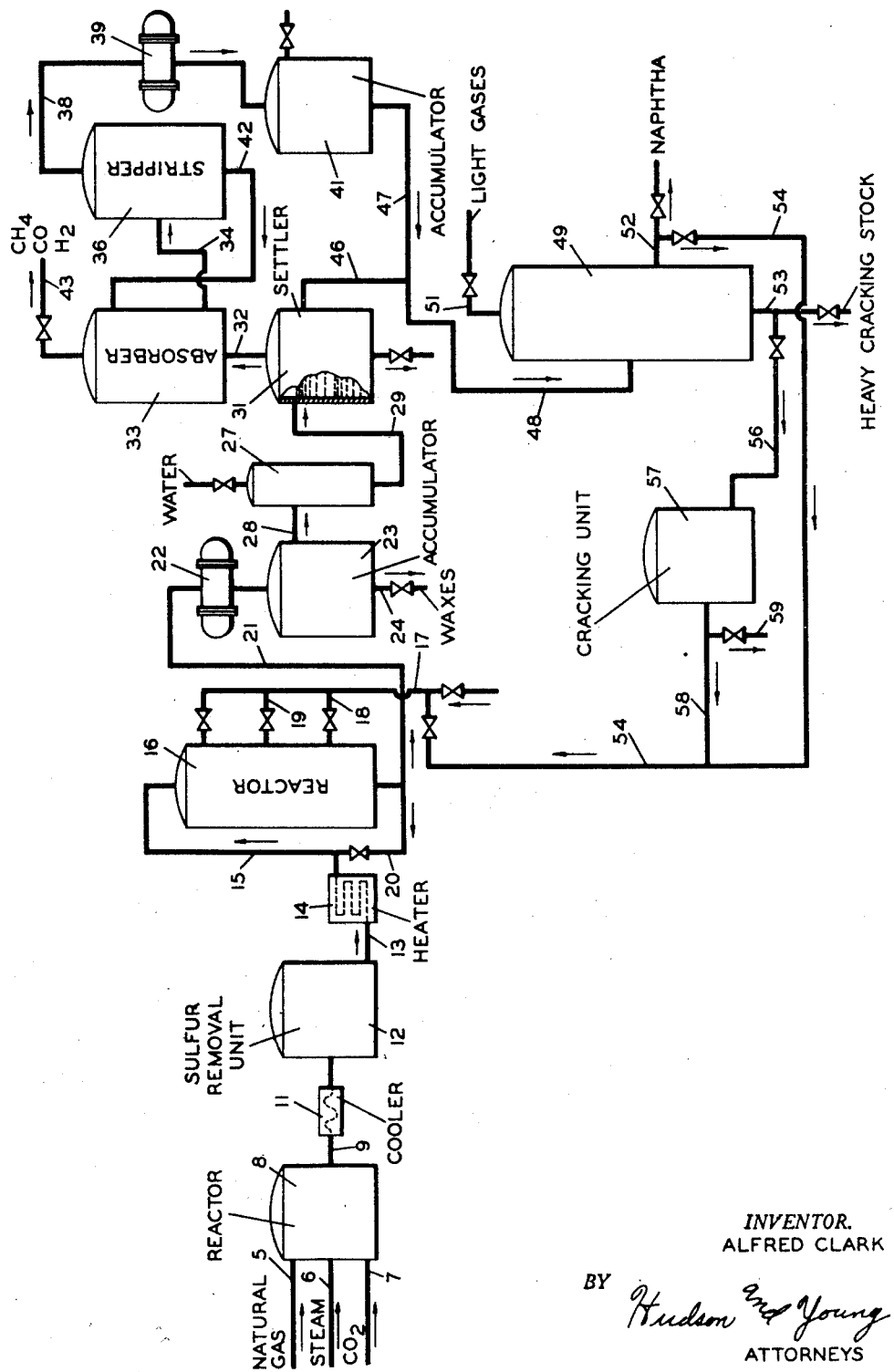
*INVENTOR.*
ALFRED CLARK
BY Hudson and Young
ATTORNEYS Patented Feb. 14, 1950

2,497,761

UNITED STATES PATENT OFFICE 2,497,761

SYNTHESIS OF HYDROCARBONS

Alfred Clark, Bartlesville, Okla., assignor to Phillips Petroleum Company, a corporation of Delaware Application September 10, 1945, Serial No. 615,348

9 Claims. (Cl. 260—449.6)

This invention relates to the synthesis of hydrocarbons. In one aspect this invention relates to the conversion of hydrogen and an oxide of carbon into hydrocarbons. In still another aspect this invention relates to the synthesis of normally liquid hydrocarbons by the interaction of hydrogen and carbon monoxide in the presence of a synthesis catalyst.

It has been known for some time that hydrogen and carbon monoxide may be made to react exothermically in the presence of certain catalysts and under specific reaction conditions to form hydrocarbons and oxygenated compounds. The formation of hydrocarbons having more than one carbon atom per molecule, especially those hydrocarbons boiling within the gasoline range, is favored by relatively low pressures and low temperatures. In general, the synthesis of hydrocarbons by the hydrogenation of carbon monoxide is accomplished in the presence of a metal chosen from group VIII of the periodic table as a catalyst at pressures below about 500 pounds per square inch gage and at temperatures below about 350° C. The synthesis feed gas comprises a mixture of about 2 moles of hydrogen per mole of carbon monoxide, and is prepared by the catalytic conversion of natural gas, steam and carbon dioxide. It is highly desirable to produce a product of predominantly normally liquid hydrocarbons, especially a hydrocarbon fraction boiling within the gasoline range. Whether a normally gaseous, liquid or solid hydrocarbon is produced depends to some extent upon the reaction conditions, especially temperature, which are used to effect the synthesis.

The application of thermodynamic principles to the hydrogenation of carbon monoxide indicates the feasibility of producing those hydrocarbons boiling within the gasoline range. The approximate linear free energy-temperature relations for the synthesis of methane, ethane, normal hexene, normal hexane, and normal octane, are illustrated by the following over-all equations for reactions occurring in the gas phase with nickel or cobalt catalysts. These equations are represented graphically in "The Chemistry of Petroleum Derivatives" by Carleton Ellis, vol. II; 1934, page 1226.

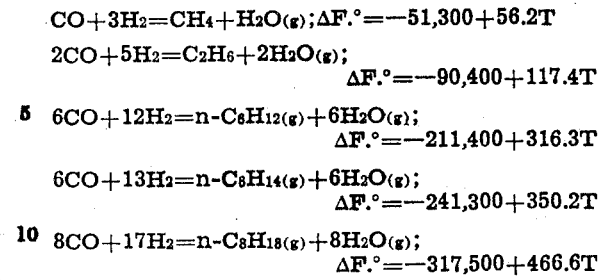

The production of hydrocarbons from carbon monoxide and hydrogen is favored thermodynamically, as is evident from the large negative values of the standard free energy change for the over-all reactions. In the series, methane, ethane, hexene, normal hexane, and normal octane, the free energy change becomes more negative with the size of the molecule so that the formation of higher members of the series is quite feasible. At about 300° C., and atmospheric pressure, it should be possible to obtain any of the paraffin hydrocarbons by reduction of carbon monoxide in the presence of appropriate catalysts. The validity of this conclusion has been confirmed by the isolation and identification of some of the reaction products which included practically all the members of the aliphatic series from ethane to hectopentacontane ($C_{150}H_{302}$).

An object of this invention is to increase the yield of hydrocarbons having more than one carbon atom per molecule in the hydrogenation of carbon monoxide.

Another object is to synthetically produce normally liquid hydrocarbons boiling within the gasoline range by the interaction of hydrogen and an oxide of carbon in the presence of a suitable synthesis catalyst.

Other objects and advantages will become apparent to those skilled in the art from the accompanying description and disclosure.

According to this invention, hydrocarbons are synthesized by reacting hydrogen and an oxide of carbon in the presence of a suitable synthesis catalyst, and simultaneously contacting the products of reaction with excess vaporous hydrocarbons over and above those formed by the reaction between hydrogen and the oxide of carbon. In one aspect of this invention, it has been found that the yield of normally liquid hydrocarbons can be increased by passing hydrogen and carbon monoxide into a reaction zone under conditions such that hydrocarbons having more than one carbon atom per molecule are formed and simultaneously introducing a hydrocarbon or a mixture of hydrocarbons into the reaction zone to promote the formation of normally liquid hydrocarbons therein.

The hydrocarbon introduced into the reaction zone comprises a hydrocarbon having not less than about 5 carbon atoms per molecule and not more than about 12 carbon atoms per molecule. Preferably, the hydrocarbon is an unsaturated aliphatic hydrocarbon, such as a hexene, a heptene, or an octene. The hydrocarbon may be introduced alone or in admixture with other hydrocarbons. When the hydrocarbon is introduced as a hydrocarbon mixture, preferably the mixture comprises a predominantly olefinic hydrocarbon fraction boiling within the range between about 25 and 200° C., such as a fraction obtained from a refinery cracking process.

Although the hydrocarbon may be introduced into the reaction zone as a liquid, conditions of temperature and pressure are maintained in the reaction zone such that substantially all of the hydrocarbon is volatilized and passes through the reaction zone as a vapor with the hydrogen and carbon monoxide. In some instances it may be desirable to introduce the hydrocarbon into the reaction zone directly as a vapor.

The hydrocarbon may be injected into the reaction zone separately or in admixture with the hydrogen and carbon monoxide. Multipoint injection of the hydrocarbon separately into the reaction zone along the path of flow of the reactants is within the scope of this invention. The manner of introducing the hydrocarbon or mixture of hydrocarbons into the reaction zone is not considered limiting, but it is preferable that the hydrocarbon be present in the reaction zone as a vapor rather than as a liquid.

The exact mechanism of the reactions induced by the presence of the hydrocarbon is not definitely known. However, when using an unsaturated hydrocarbon, the unsaturated hydrocarbon probably reacts with the normally gaseous hydrocarbons formed in the reaction zone to produce heavier hydrocarbons as is evidenced by the increased yield of heavier hydrocarbons. The reaction may be that of alkylation, or conjunct polymerization, or both. Nevertheless, the presence of a relatively heavy hydrocarbon in the reaction zone, whether saturated or unsaturated, results in a substantially increased yield of heavier hydrocarbons, especially normally liquid hydrocarbons. The addition of such a hydrocarbon to the synthesis reaction does not consume any substantial amount of hydrogen, and thus the consumption of hydrogen is not increased above that consumed by the normal synthesis reaction without the addition of the hydrocarbon.

An effluent is withdrawn from the reaction zone and products of the process separated therefrom.

It has been found that the reintroduction of an intermediate fraction separated from the total hydrocarbon product of the synthesis reaction is particularly effective in increasing the yield of normally liquid hydrocarbons. The preferred embodiment of this invention comprises contacting hydrogen and an oxide of carbon in the reaction zone with a suitable synthesis catalyst under reaction conditions such that hydrocarbons having more than one carbon atom per molecule are produced, withdrawing an effluent from the reaction zone, and separating and recycling to the reaction zone at least a portion of the hydrocarbon product boiling within the range between about 25 and about 200° C.

In general, that portion of the hydrocarbon product which boils within the gasoline range is recycled to the reaction zone. Such a fraction ranges from $C_5$ hydrocarbons to about $C_8$ or $C_9$ or even $C_{10}$ hydrocarbons. From about 5 to about 7 parts by weight of recycle to about 10 parts of total hydrocarbon product is recycled.

Since it is preferred to introduce a hydrocarbon mixture which has a substantial proportion of unsaturated hydrocarbons therein, the synthesis reaction is carried out in such a manner that the proportion of unsaturated hydrocarbons formed by the initial interaction of hydrogen and carbon monoxide is relatively high. The proportion of unsaturated hydrocarbons is influenced by the catalyst and by the ratio of hydrogen to carbon monoxide.

The relative tendency to form unsaturated hydrocarbons in the presence of various synthesis catalysts is shown in Table I below:

TABLE I

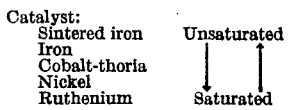

Sintered iron or an iron catalyst is preferred as the synthesis catalyst to be used in effecting the formation of hydrocarbons from hydrogen and carbon monoxide when additional hydrocarbons are introduced into the reaction zone.

Upon use the catalyst may decrease in activity as the result of the deposition of carbonaceous deposits thereon. Regeneration of the catalyst may be achieved in the conventional manner, such as by treatment with hydrogen at elevated temperatures.

A molar ratio of hydrogen to carbon monoxide between about 3 to 1 and about 1 to 1 is used in effecting the synthesis reaction. However, since a decrease in the amount of hydrogen present in the synthesis reaction increases the tendency for the formation of unsaturated hydrocarbons, a molar ratio of hydrogen to carbon monoxide between about 3 to 2 and about 1 to 1 is preferred. When the feed mixture contains a ratio of hydrogen to carbon monoxide within the above ranges, this ratio remains substantially constant throughout the reaction. The recycle or introduction of a hydrocarbon fraction containing unsaturated hydrocarbons does not consume appreciable amounts of hydrogen and thus does not effect the hydrogen to carbon monoxide ratio.

A space velocity between about 80 and about 300 volumes of reactants per volume of catalyst per hour is adequate for effecting the synthesis reaction. Preferably, a space velocity between about 100 and about 150 is used. When using a sintered iron catalyst a space velocity of fresh reactants of about 300 to 400 is used with a recycle ratio of total effluent of about 100:1. The recycle or introduction of a normally liquid hydrocarbon fraction into the reaction zone does not appreciably change the space velocity. For example, using a space velocity of about 100, the recycle of a fraction as previously described will increase the space velocity to only about 102.

Table II below shows preferred temperatures and pressures for various catalysts which may be used in accordance with this invention.

TABLE II

*Preferred ranges of operation of some common catalysts for the production of synthetic hydrocarbons*

| | Catalyst | Temperature, °C. | | Pressure, p. s. i. g. | |
|---|---|---|---|---|---|
| | | Broad Range | Pref. Range | Broad Range | Pref. Range |
| 1 | Cobalt-Thoria | 180-250 | 190-210 | 15-500 | 100 |
| 2 | Iron-Alkali and/or Copper | 210-280 | 230-260 | 15-500 | 75-300 |
| 3 | Sintered Iron | 265-350 | 310-330 | 15-500 | 220-300 |
| 4 | Ruthenium | 180-250 | 190-210 | 1,000-2,000 | 1,200-1,500 |
| 5 | Nickel-Thoria | 175-220 | 190-210 | 15-100 | 15-50 |
| 6 | Nickel-Manganese-Alumina | 175-220 | 190-210 | 15-100 | 15-50 |
| 7 | Cobalt | 175-220 | 180-200 | 15-500 | 100 |

Another modification of the present invention comprises separating a hydrocarbon product boiling above about 200° C. from the synthesis process and cracking the same under known conditions, either thermally or catalytically. The cracked hydrocarbon fraction is then recycled to the hydrocarbon synthesis reaction zone to promote the formation of normally liquid hydrocarbons. In this modification, substantially all of the hydrocarbon products of the synthesis process are utilized, and an increased yield of normally liquid hydrocarbons is realized.

In some instances, depending on operating conditions, the catalyst used, and the composition of the recycle fraction, etc., the normally liquid hydrocarbon product may contain undesirable unsaturated hydrocarbons. Under such circumstances the hydrocarbon product may be hydrogenated in the conventional manner to produce a more saturated hydrocarbon product.

The accompanying drawing diagrammatically represents apparatus for a typical process for the synthesis of hydrocarbons embodying the present invention.

In order that this invention may be more clearly understood and its applicability realized, a brief description of a process embodying features of the present invention will be illustrated. Natural gas containing methane, steam and carbon dioxide obtained from suitable sources are introduced into reactor 8 through lines 5, 6 and 7, respectively. Hydrogen and carbon monoxide are formed in reactor 8 in the presence of a suitable catalyst, such as nickel, at approximately atmospheric pressure and at a temperature between about 700 and about 800° C. The effluent from reactor 8 contains hydrogen and carbon monoxide in a molar ratio of about 2:1, and about 0.5 to about 1.0 mole per cent impurities, such as sulfur.

From reactor 8, the effluent passes to sulfur removal unit 12 by line 9 and through cooler 11. Both inorganic and organic sulfur are removed from the effluent in unit 12 by conventional methods known in the art. Inorganic sulfur may be removed by solvent extraction with an amine solution. Organic sulfur compounds are decomposed in the presence of a suitable catalyst, such as a copper oxide-lead chromate combination, at an elevated temperature of about 400° C. The resulting hydrogen sulfide from the decomposition is removed by solvent extraction. The purified effluent of hydrogen and carbon monoxide is then passed to heater 14 by line 13 and thence to reactor 16 by line 15.

In reactor 16 hydrocarbons are synthesized under reaction conditions similar to those previously described and in the presence of a suitable catalyst. A hydrocarbon fraction boiling between about 25 and about 300° C. is introduced into reactor 16 through lines 17, 18 and 19. This hydrocarbon fraction may be obtained from various sources; preferably, however, the fraction is obtained by separating a portion of the hydrocarbon product of the process and recycling the same to reactor 16 through lines 54 and 17.

From reactor 16 an effluent containing hydrocarbons is passed to cooler 22 via line 21 where partial condensation is effected and the condensate is collected in accumulator 23 and discharged therefrom through line 24. A portion of the effluent may be recycled to reactor 16 via line 20, if desired. This condensate comprises heavy hydrocarbons and waxes. The temperature of the effluent gases leaving reactor 16 is about 200° C. and cooling the gases to about 150° C. is sufficient to accomplish the degree of partial condensation desired in accumulator 23. Uncondensed gases from accumulator 23 are passed to cooling tower 27 by line 28 wherein gases are condensed by a spray of water which cools them to about 25° C. Water and liquid hydrocarbons are withdrawn from tower 27 through line 29 and are passed to settler 31 for a liquid phase separation between hydrocarbons and water.

Uncondensed gases leave settler 31 through line 32 and pass to mineral seal oil absorber 33. Recovery of propane, butane and heavier hydrocarbons is effected in absorber 33 by absorption of these hydrocarbons in mineral seal oil in the conventional manner. The hydrocarbon rich mineral seal oil is withdrawn from the lower portion of absorber 33 and is passed to a stripping column 36 via line 34. Light hydrocarbons, such as propane, butane, etc., are stripped from the mineral seal oil by lowering the pressure or heating in stripping column 36. Recovered hydrocarbons from stripping column 36 are passed via line 38 and condenser 39 to accumulator 41. Stripped mineral seal oil is recirculated to absorber 33 by means of line 42. Light gases such as hydrogen, methane, carbon monoxide, are removed from absorber 33 through line 43 and discarded or used as fuel, if desired. These gases may also be passed to a second and smaller reactor (not shown) for the conversion of the remaining hydrogen and carbon monoxide to hydrocarbons.

Liquid hydrocarbons from settler 31 and accumulator 41 are passed via lines 46, 47 and 48 to fractionator 49 wherein desired products are separated and recovered. Light gases are withdrawn from fractionator 49 through line 51. Hydrocarbons boiling between about 25 and about 200° C. are withdrawn through line 52 for processing into a finished gasoline, and heavier hydrocarbons boiling above about 200° C. are removed by line 53. A portion of the fraction separated which boils between about 25 and about 200° C. is recycled to reactor 16 through lines 54 and 17 to promote the yield of normally liquid hydrocarbons formed by the hydrogenation of the carbon monoxide. If desired, a portion or all of the heavier hydrocarbons boiling above 200° C. may be passed to cracking unit 57 where the heavier hydrocarbons are thermally or catalytically cracked under appropriate conditions known in the art to lighter hydrocarbons, usually olefinic hydrocarbons, boiling in a range between about 25 and 200° C. From cracking unit 57, this light hydrocarbon fraction is then passed to reactor 16 through lines 58, 54 and 17 to promote the yield of normally liquid hydrocarbons. Both hydrocarbon fractions from line 52 and line 58 may be introduced simultaneously into reactor 16, or either of the fractions may be sufficient alone; thus, either one or both of the fractions may be introduced into reactor 16. A portion or all of the effluent from cracking unit 57 may be discharged from the system through line 59 for other uses or further treatment, if desired.

EXAMPLES

The following examples illustrate the utility and advantages of recycling a portion of the synthesis product to the reaction zone. Example I shows the synthesis of hydrocarbons from 100 liters of synthesis gas comprising hydrogen and carbon monoxide in the presence of a cobalt-thoria catalyst without recycling or introducing a hydrocarbon into the reaction zone as described in this invention.

Example I

Conditions:

Feed stock { Molar ratio of $H_2:CO=2:1$
{ 100 liters of gas.
Temperature ____ 200° C.
Pressure _____ 100 p. s. i. g.
Space velocity ___ 100
Hydrocarbon product:
  Components:                                Weight per cent
    Hydrocarbons boiling below 25° C. ___      2
    Hydrocarbons boiling between 25 and
      200° C. _____ 58
    Liquid hydrocarbons boiling above
      200° C. _____ 34
    Waxes _____  6
                                              ---
                                              100
Analysis of liquid fraction boiling below 200° C.:
  Total unsaturates _____ 50%
Yield:
  6 cc. of hydrocarbons boiling between 25 and 200° C. per 100 liters of synthesis gas.
Total hydrocarbons above ethane in effluent = 65 weight per cent.

Example II

Example II shows the results obtainable in the presence of a cobalt-thoria catalyst when an intermediate fraction boiling between 25 and 200° C. is separated from the hydrocarbon product and is recycled to the reaction zone under similar reaction conditions to those in Example I.

Conditions:

Feed stock _____ { Molar ratio of $H_2:CO=2:1$
                  { 100 liters of gas
Temperature ____ 200° C.
Pressure _____ 100 p. s. i. g.
Space velocity ___ 100
Recycle of
  25-200°
  C. fraction ____ 4 volumes of recycle per 100 volumes of feed stock.

Product:

Weight
  Components:                             Per cent
    Hydrocarbons boiling below 25° C. ___  1
    Hydrocarbons boiling between 25
      and 200° C. _____ 60
    Hydrocarbons boiling above 200° C. __ 39
                                         ---
                                         100

Yield:
  10 cc. of hydrocarbons boiling between 25 and 200° C. produced per 100 liters of synthesis gas.

It is evident, therefore, that the recycle of a hydrocarbon fraction increases the yield of normally liquid hydrocarbons as much as 66% or more.

Various modifications of the present invention may become apparent to those skilled in the art without departing from the scope of this invention.

I claim:

1. A process for the synthesis of normally liquid hydrocarbons by the interaction of hydrogen and carbon monoxide, which comprises contacting hydrogen and carbon monoxide in a reaction zone in the presence of a sintered iron synthesis catalyst at a temperature between about 265 and 350° C. and a pressure between about 15 and 500 pounds per square inch gage, maintaining the molar ratio of hydrogen to carbon monoxide about 3:2 and about 1:1, maintaining a space velocity between about 100 and 200, withdrawing an effluent from said reaction zone comprising unsaturated aliphatic hydrocarbons, separating a predominantly unsaturated aliphatic hydrocarbon fraction boiling between about 25 and 200° C. from said effluent, recycling the fraction thus separated to said reaction zone, and maintaining conditions of temperature and pressure within the aforesaid limits such that substantially all of said recycled hydrocarbons are in the vapor phase.

2. A process for the synthesis of normally liquid hydrocarbons by the interaction of hydrogen and carbon monoxide, which comprises contacting hydrogen and carbon monoxide in a reaction zone in the presence of an iron synthesis catalyst at a temperature between about 210 and 280° C. and a pressure between about 15 and 500 pounds per square inch gage, maintaining the molar ratio of hydrogen to carbon monoxide between about 3:2 and about 1:1, maintaining a space velocity between about 100 and 200, withdrawing an effluent from said reaction zone comprising unsaturated aliphatic hydrocarbons, separating a predominantly unsaturated aliphatic hydrocarbon fraction boiling between about 25 and 200° C. from said effluent, recycling the fraction thus separated to said reaction zone, and maintaining conditions of temperature and pressure within the aforesaid limits such that substantially all of said recycled hydrocarbons are in the vapor phase.

3. A process for the synthesis of normally liquid hydrocarbons by the interaction of hydrogen and carbon monoxide, which comprises contacting hydrogen and carbon monoxide in a reaction zone in the presence of a cobalt-thoria synthesis catalyst at a temperature between about 180 and 250° C. and a pressure between about 15 and 500 pounds per square inch gage, maintaining the molar ratio of hydrogen to carbon monoxide between about 3:2 and about 1:1, maintaining a space velocity between about 100 and 200, withdrawing an effluent from said reaction zone comprising unsaturated aliphatic hydrocarbons, separating a predominantly unsaturated aliphatic hydrocarbon fraction boiling between about 25 and 200° C. from said effluent, recycling the fraction thus separated to said reaction zone, and maintaining conditions of temperature and pressure within the aforesaid limits such that substantially all of said recycled hydrocarbons are in the vapor phase.

4. A process for the synthesis of normally liquid hydrocarbons by the interaction of hydrogen and carbon monoxide, which comprises contacting hydrogen and carbon monoxide in a reaction zone in the presence of a synthesis catalyst at a temperature between 180 and 350° C., maintaining the molar ratio of hydrogen to carbon monoxide between about 3:2 and about 1:1, withdrawing an effluent from said reaction zone comprising unsaturated aliphatic hydrocarbons, separating a predominantly unsaturated aliphatic hydrocarbon fraction thus produced boiling between about 25 and 200° C. from said effluent, recycling the fraction thus separated to said reaction zone in an amount between 5 and 7 parts by weight per 10 parts of product, and maintaining conditions of temperature and pressure such that substantially all of said recycled hydrocarbons are in the vapor phase.

5. A process for the synthesis of normally liquid hydrocarbons by the interaction of hydrogen and an oxide of carbon, which comprises contacting hydrogen and an oxide of carbon in a reaction zone in the presence of a suitable synthesis catalyst under reaction conditions such that olefinic hydrocarbons are produced, withdrawing an effluent from said reaction zone, separating a predominantly olefinic fraction so produced boiling within the range between about 25 and about 200° C. from said effluent, and recycling same to said reaction zone.

6. A process for the synthesis of normally liquid hydrocarbons by the interaction of hydrogen and an oxide of carbon, which comprises contacting hydrogen and an oxide of carbon in a reaction zone in the presence of a suitable synthesis catalyst under reaction conditions such that unsaturated aliphatic hydrocarbons are produced, withdrawing an effluent from said reaction zone, separating a predominantly unsaturated aliphatic hydrocarbon fraction so produced boiling within the range between about 25 and about 200° C. from said effluent, and recycling between about 5 and about 7 parts by weight of hydrocarbons boiling within the aforesaid temperature range per 10 parts of total hydrocarbon product to said reaction zone.

7. The process for the synthesis of normally liquid hydrocarbons by the hydrogenation of carbon monoxide, which comprises passing a mixture of hydrogen and carbon monoxide through a reaction zone in the presence of a suitable synthesis catalyst under conditions such that hydrocarbons are produced, withdrawing an effluent from said reaction zone, separating at least a portion of hydrocarbons produced boiling above about 200° C., cracking said hydrocarbons thus separated under conditions such that lower-boiling unsaturated hydrocarbons are produced, and passing a resulting effluent from the aforesaid cracking step to said reaction zone.

8. In a process for the synthesis of hydrocarbons having more than one carbon atom per molecule, wherein hydrogen is reacted with an oxide of carbon in the presence of a suitable synthesis catalyst in a reaction zone under conditions which effect the formation of said hydrocarbons, the improvement which comprises introducing into said reaction zone a predominantly olefinic hydrocarbon fraction of said synthesis in liquid form boiling between 25° and 200° C. in an amount between 5 and 7 parts by weight per 10 parts of product, and maintaining reaction conditions in said zone which effect the vaporization of substantially all of said hydrocarbon fraction in said zone whereby the yield of said hydrocarbons is increased over the yield obtained without the introduction of said hydrocarbon fraction into said reaction zone.

9. The process of claim 7 in which the synthesis temperature is between 180 and 350° C., the ratio of hydrogen to carbon monoxide is between 3:2 and 1:1, and the space velocity is between 100 and 200.

ALFRED CLARK.

REFERENCES CITED

The following references are of record in the file of this patent:

UNITED STATES PATENTS

| Number | Name | Date |
|---|---|---|
| 2,231,990 | Dreyfus | Feb. 18, 1941 |
| 2,244,196 | Herbert | June 3, 1941 |
| 2,248,196 | Plummer | July 2, 1941 |
| 2,253,607 | Boyd et al. | Aug. 26, 1941 |
| 2,264,427 | Asbury | Dec. 2, 1941 |
| 2,318,626 | Pier | May 11, 1943 |
| 2,406,851 | Redcay | Sept. 3, 1946 |
| 2,433,072 | Stewart et al. | Dec. 23, 1947 |

Certificate of Correction

Patent No. 2,497,761                                                               February 14, 1950

ALFRED CLARK

It is hereby certified that errors appear in the printed specification of the above numbered patent requiring correction as follows:

Column 7, line 75, for "900° C." read *200° C.*; column 8, line 46, after the word "monoxide" insert *between*;

and that the said Letters Patent should be read with these corrections therein that the same may conform to the record of the case in the Patent Office.

Signed and sealed this 20th day of June, A. D. 1950.

[SEAL]

THOMAS F. MURPHY,
*Assistant Commissioner of Patents.*